United States Patent
King et al.

(10) Patent No.: US 10,454,403 B2
(45) Date of Patent: Oct. 22, 2019

(54) AXIAL BRUSHLESS DC MOTOR WITH FRACTIONAL AND HOLD STEP FUNCTION

(71) Applicant: CTS Corporation, Lisle, IL (US)

(72) Inventors: Yulanda King, Amherst, NY (US); Scott Calkins, Elkhart, IN (US)

(73) Assignee: CTS Corporation, Lisle, IL (US)

( * ) Notice: Subject to any disclaimer, the term of this patent is extended or adjusted under 35 U.S.C. 154(b) by 0 days.

(21) Appl. No.: 15/596,004

(22) Filed: May 16, 2017

(65) Prior Publication Data

US 2017/0250637 A1   Aug. 31, 2017

Related U.S. Application Data

(63) Continuation-in-part of application No. 15/017,237, filed on Feb. 5, 2016, now Pat. No. 10,148,152.

(60) Provisional application No. 62/338,780, filed on May 19, 2016.

(51) Int. Cl.
| | |
|---|---|
| *H02K 11/30* | (2016.01) |
| *H02P 8/22* | (2006.01) |
| *H02K 11/215* | (2016.01) |
| *H02K 1/18* | (2006.01) |
| *H02K 1/27* | (2006.01) |
| *H02K 37/12* | (2006.01) |
| *H02K 21/24* | (2006.01) |
| *H02P 8/42* | (2006.01) |
| *H02K 11/33* | (2016.01) |

(52) U.S. Cl.
CPC ............... *H02P 8/22* (2013.01); *H02K 1/182* (2013.01); *H02K 1/2793* (2013.01); *H02K 11/215* (2016.01); *H02K 11/30* (2016.01); *H02K 11/33* (2016.01); *H02K 21/24* (2013.01); *H02K 37/125* (2013.01); *H02P 8/42* (2013.01); *H02K 2213/03* (2013.01)

(58) Field of Classification Search
CPC ...... H02K 7/083; H02K 1/182; H02K 1/2793; H02K 3/522; H02K 5/1735; H02K 7/085; H02K 15/12; H02K 21/24
USPC ...................................................... 310/68 B
See application file for complete search history.

(56) References Cited

U.S. PATENT DOCUMENTS

| | | |
|---|---|---|
| 1,977,184 A | 10/1934 | Haydon |
| 2,699,365 A | 1/1955 | Indergand et al. |
| 2,703,737 A | 3/1955 | Turner |

(Continued)

FOREIGN PATENT DOCUMENTS

| | | | |
|---|---|---|---|
| DE | 102013109877 | * 3/2015 | .............. H02P 6/085 |
| DE | 102013109877 A1 | 3/2015 | |

(Continued)

OTHER PUBLICATIONS

Overview of Wye and Delta solidly-grounded Systems, Nov. 2014.*

(Continued)

*Primary Examiner* — Terrance L Kenerly
(74) *Attorney, Agent, or Firm* — Daniel Deneufbourg (57) ABSTRACT

An axial brushless DC motor comprising a stator including a plurality of coils, a rotor including a magnet with a plurality of pairs of magnetic poles and adapted for movement relative to the stator in one or more full steps, and a coil phase circuit adapted for moving the rotor relative to the stator a fractional step less than the one or more full steps and/or holding the rotor at the fractional or one or more full steps.

12 Claims, 5 Drawing Sheets

(56) References Cited

U.S. PATENT DOCUMENTS

| | | | |
|---|---|---|---|
| 3,117,268 A * | 1/1964 | Madsen | H02P 8/20 |
| | | | 310/49.33 |
| 3,936,685 A | 2/1976 | Glockner et al. | |
| 4,223,255 A | 9/1980 | Goldman et al. | |
| 4,398,773 A | 8/1983 | Boden et al. | |
| 4,435,673 A | 3/1984 | Hagino et al. | |
| 4,529,900 A | 7/1985 | Uzuka | |
| 4,585,979 A | 4/1986 | Sakamoto et al. | |
| 4,692,674 A | 9/1987 | Packard et al. | |
| 4,739,867 A | 4/1988 | Harrington | |
| 4,839,585 A | 1/1989 | Bicknell | |
| 5,101,131 A | 3/1992 | Ushiro et al. | |
| 5,168,187 A * | 12/1992 | Baer | H02K 1/2793 |
| | | | 310/185 |
| 5,334,898 A | 8/1994 | Skybyk | |
| 5,514,923 A | 5/1996 | Gossler et al. | |
| 5,828,151 A | 10/1998 | Bustamante et al. | |
| 5,923,110 A | 1/1999 | Zhao et al. | |
| 5,880,551 A | 3/1999 | Prudham | |
| 6,097,121 A | 8/2000 | Oku | |
| 6,246,137 B1 | 1/2001 | Obara | |
| 6,222,288 B1 | 4/2001 | Izquierdo et al. | |
| 6,348,751 B1 | 2/2002 | Jermakian et al. | |
| 6,441,530 B1 | 8/2002 | Petersen | |
| 6,605,883 B2 | 8/2003 | Isozaki et al. | |
| 6,995,494 B2 | 2/2006 | Haugan et al. | |
| 7,049,723 B2 | 5/2006 | Suzuki et al. | |
| 7,554,226 B2 * | 6/2009 | Kojima | H02K 3/524 |
| | | | 310/156.36 |
| 7,816,882 B2 | 10/2010 | Nashiki et al. | |
| 8,415,885 B2 | 4/2013 | Li et al. | |
| 2005/0147512 A1 | 7/2005 | Chen et al. | |
| 2006/0279150 A1 | 12/2006 | Kojima | |
| 2007/0138983 A1 | 6/2007 | De Filippis et al. | |
| 2008/0061649 A1 | 3/2008 | Kim | |
| 2009/0033159 A1 | 2/2009 | West | |
| 2009/0189471 A1 | 7/2009 | Amano et al. | |
| 2011/0293213 A1 | 12/2011 | Eichelmann | |
| 2013/0009508 A1 | 1/2013 | Takamatsu et al. | |
| 2014/0001902 A9 | 1/2014 | Camilleri et al. | |
| 2014/0265653 A1 | 9/2014 | Heins et al. | |
| 2016/0241107 A1 | 8/2016 | King et al. | |

FOREIGN PATENT DOCUMENTS

| | | |
|---|---|---|
| JP | S63277455 A | 11/1988 |
| JP | H01315244 A | 12/1989 |
| WO | 2011/040267 A1 | 4/2011 |
| WO | 2013/088670 A1 | 6/2013 |
| WO | 2015189121 A2 | 12/2015 |

OTHER PUBLICATIONS

Brushless DC Motor, All About Circuits, 2014, Chapter 13, vol. II.
CTS Series 647/648 Radial Brushless DC Motor, 2012/2013.

* cited by examiner

AXIAL BRUSHLESS DC MOTOR WITH FRACTIONAL AND HOLD STEP FUNCTION

CROSS-REFERENCE TO RELATED APPLICATIONS

This patent application claims priority and benefit of the filing date of and is a continuation-in-part of U.S. patent application Ser. No. 15/017,237 filed on Feb. 5, 2016, the disclosure and contents of which is expressly incorporated herein in its entirety by reference.

This patent application also claims priority and benefit of the filing date of U.S. Provisional Patent Application Ser. No. 62/338,780 filed on May 19, 2016, the disclosure and contents of which is expressly incorporated herein in its entirety by reference.

FIELD OF THE INVENTION

The present invention relates generally to an electric motor and, in particular, to an axial brushless DC motor with fractional half, hold, and micro stepping functions.

BACKGROUND OF THE INVENTION

The present invention is directed to an axial brushless electric motor of the type disclosed in United States Patent Publication No. 2016/0241107 to King et al., the entire disclosure and contents of which are incorporated herein by reference as though fully set forth herein.

There remains a need for a more cost effective axial brushless motor.

The present invention satisfies this need by adding fractional half, hold, and micro step function elements to an axial brushless electric motor of the type disclosed in United States Patent Publication No. 2016/0241107 or the purpose of advantageously increasing resolution and reducing resonances.

SUMMARY OF THE INVENTION

The present invention is generally directed to an axial brushless DC motor comprising a stator including a plurality of coils, a rotor including a magnet with a plurality of pairs of magnetic poles and adapted for movement relative to the stator in one or more full steps, and a coil phase circuit adapted for moving the rotor relative to the stator a fractional step less than the one or more full steps and/or holding the rotor at the one or more fractional or full steps.

In one embodiment, the coil phase circuit is a three phase circuit adapted to switch the orientation of one or more of the plurality of pairs of magnetic poles of the rotor during operation of the motor and hold the rotor at a half step between the one or more full steps.

In one embodiment, the coil phase circuit a three phase coil circuit adapted to switch the orientation of one or more of the plurality of pairs of magnetic poles of the rotor during operation of the motor and hold the rotor at the fractional or one or more full steps.

In one embodiment, the coil phase circuit includes a one phase coil circuit, a motor bridge coupled to the one phase coil, a motor supply coupled to the motor bridge, a microprocessor coupled to the motor bridge, and a Hall Effect sensor coupled to the microprocessor for moving the rotor during the operation of the motor in micro steps between the one or more full steps.

In one embodiment, the coil phase circuit includes a plurality of coil circuit segments coupled together at a common junction that is coupled to ground for moving the rotor in micro steps during the operation of the motor between the one or more full steps.

The present invention is also directed an axial brushless DC motor comprising a stator including a plurality of coils, a rotor including a magnet with a plurality of pairs of magnetic poles and adapted for movement relative to the stator in full step positions, and a coil phase circuit including first, second, and third coil phase segments connected in series at a common central connection point, each of the coil phase segments including a pair of coils configured in parallel, and current being adapted for flow through the coil phase circuit in a manner adapted to switch the orientation of one or more of the plurality of pairs of magnetic poles of the magnet for moving the rotor relative to the stator a fractional step position less than the full step position and/or holding the rotor at the fractional step position or full step position.

In one embodiment, the rotor is movable from a first driving position into a fractional step position less than the full step position by switching the flow of current from between the first and third coil phase segments through the common central connection point to between the second and third coil phase segments through the common central connection point.

In one embodiment, the rotor is movable from a first driving position into a full step hold position by switching the flow of current from between the first and third coil phase segments through the common central connection point to between the first and second coil phase segments and through the third coil phase segment through the common central connection point.

The present invention is also directed to an axial brushless DC motor comprising a stator including a plurality of coils, a rotor including a magnet and adapted for movement in full or fractional step position relative to the stator, and a coil phase circuit including first, second, and third coil phase segments coupled together in series at a common central connection point, each of the first, second, and third coil phase segments including a pair of coils coupled in parallel, and energizable for moving the rotor between a first driving position and full or fractional step hold positions relative to the stator.

In one embodiment, the rotor is movable between the first driving position and full or fractional hold positions relative to the stator by switching the flow of current through the first, second, and third coil phase segments of the coil phase circuits.

In one embodiment, the rotor is movable from the first driving position in which current flows through the first and third coil phase segments through the common central connection point to a fractional hold half step position in which the flow of current has been switched to flow through the second and third coil phase segments.

In one embodiment, the rotor is movable from the first driving position in which current flows through the first and third coil phase segments through the common central connection point to a full step hold position in which the flow of current has been switched to flow through both of the first and second coil phase segments and into the third coil phase segment through the common central connection point.

There are other advantages and features of this invention which will be more readily apparent from the following description of the embodiment of the invention, the drawings, and the appended claims.

BRIEF DESCRIPTION OF THE DRAWINGS

In the accompanying drawings that form part of the specification, and in which like numerals are employed to designate like parts throughout the same.

DETAILED DESCRIPTION OF THE EMBODIMENT

Figure 1:
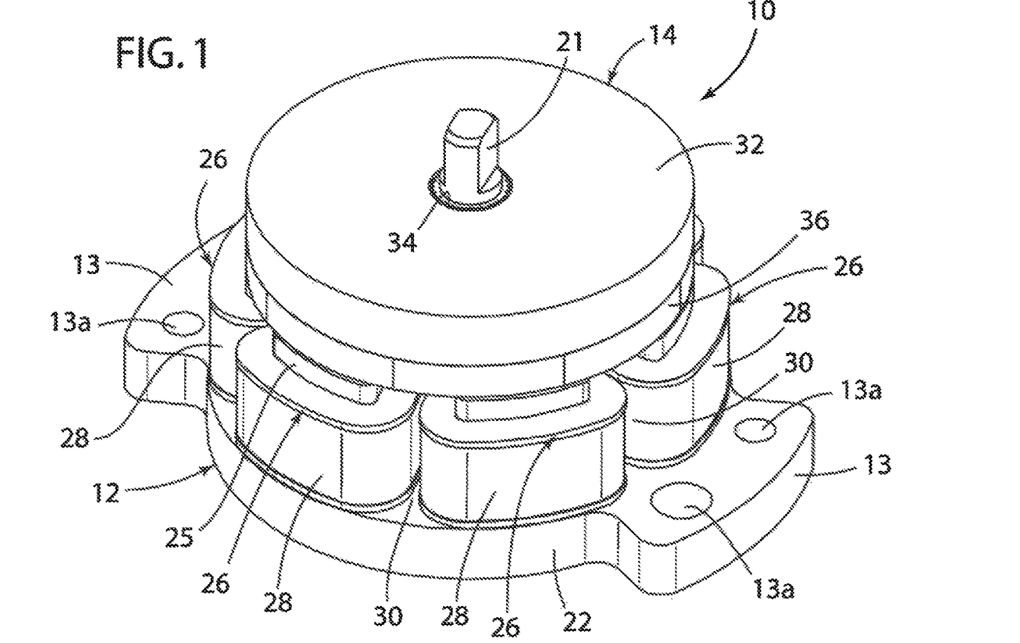
FIG. 1 is a perspective view of an axial brushless DC motor incorporating the fractional, micro, and hold step functions in accordance with the present invention.
Figure 2:
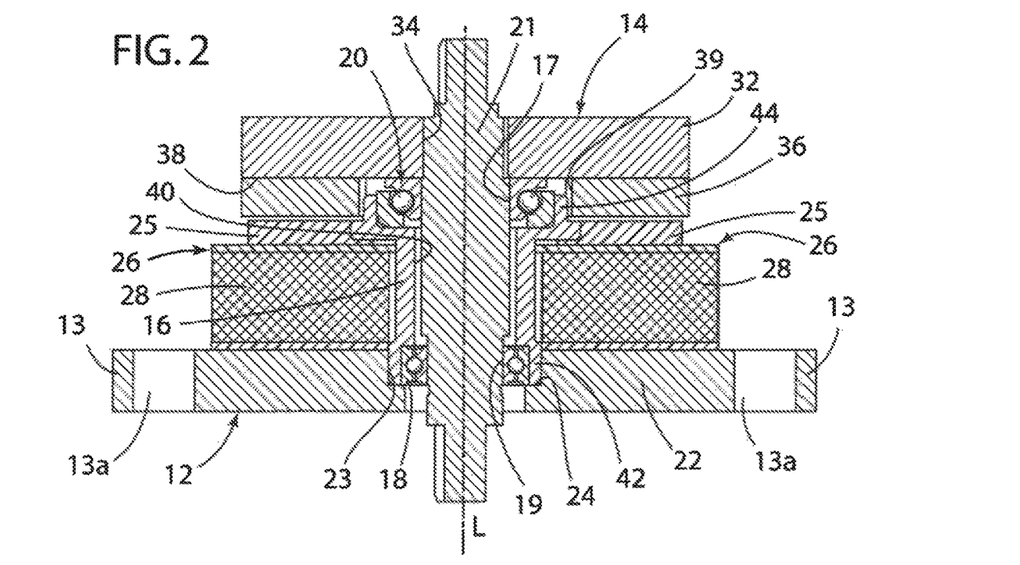
FIG. 2 is a vertical cross-sectional view of the axial brushless DC rotor shown in FIG. 1.
Figure 2A:
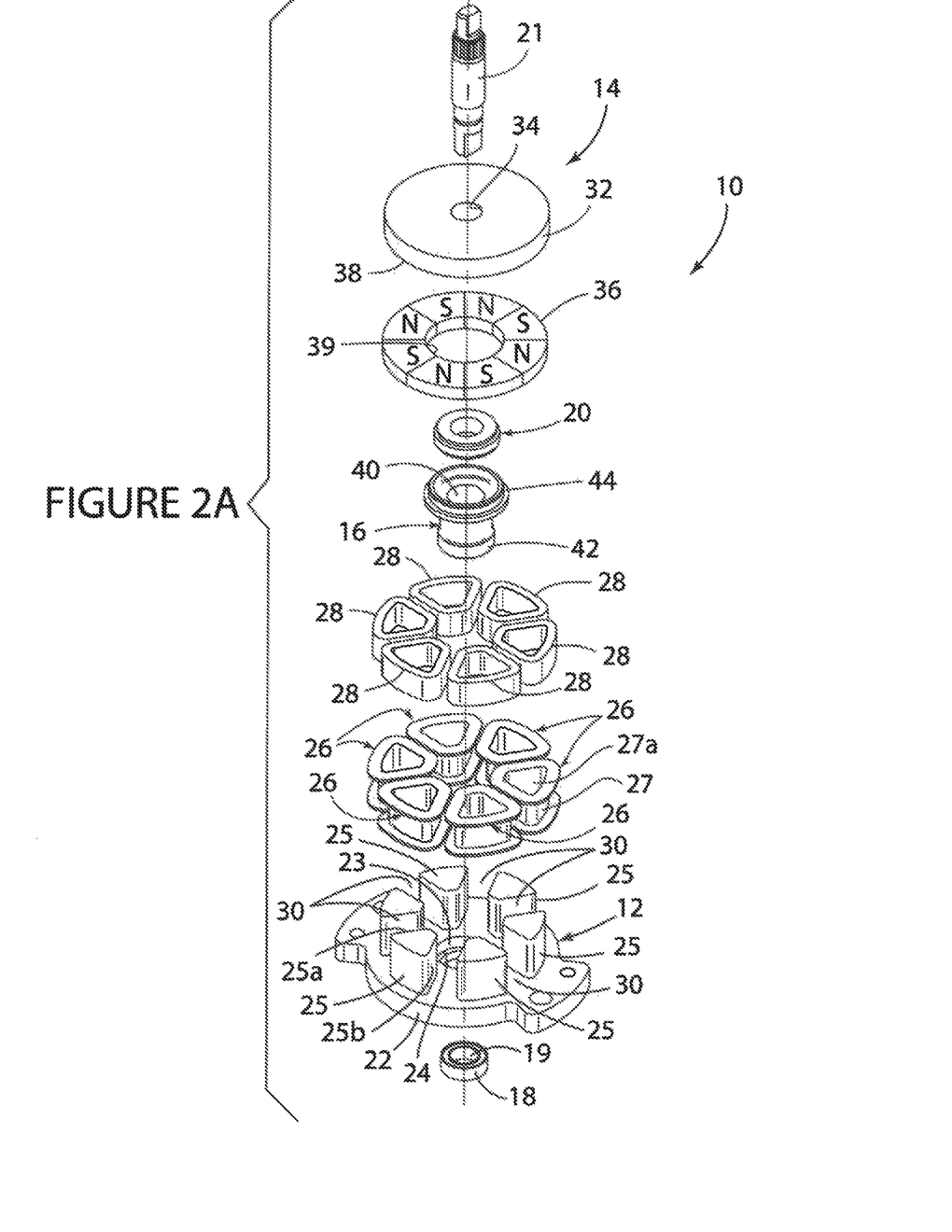
FIG. 2A is an exploded perspective view of the axial brushless DC motor shown in FIG. 1.

FIGS. 1, 2, and 2A depict an axial brushless DC motor 10 incorporating the fractional, hold, and micro step functions in accordance with the present invention and is of the type and structure disclosed in United States Patent Application Publication No. 2016/0241107 to King et al. and assigned to CTS Corporation, the entire disclosure and contents of which are incorporated and made part of this application as though fully set forth herein.

The axial brushless DC motor 10 comprises, among other elements as described in more detail in United States Patent Application Publication No. 2016/0241107 and incorporated herein by reference as though fully set forth herein, a stator or stator assembly 12, a rotor or rotor assembly 14, an elongate and generally cylindrical sleeve bushing 16 defining an interior elongate through-hole 40, a ball bearing 18 mounted on a lower end of the sleeve bushing 16, a thrust bearing 20 mounted on an upper end of the sleeve bushing 16, and an elongate motor shaft 21. In the embodiment shown, the axial brushless DC motor 10 is a three phase, eight pole, six slot axial brushless DC motor.

The stator assembly 12 includes a flat base 22 in the form and shape of a disc defining a central through-hole or aperture 23, an interior circumferential shoulder 24 defined by the interior wall of the base 22 defining the central through-hole 23 thereof, and a plurality of peripheral motor mounting brackets 13 each defining a plurality of motor mounting through-holes 13a.

In the embodiment shown, the base 22 is made from a powder metal. A plurality of stator armature posts 25, namely six in the embodiment of FIGS. 1, 2, and 3, protrude unitarily normally upwardly and outwardly from the interior face of the base 22. In the embodiment shown, the armature posts 25 are generally triangular in shape and extend full circle around the central through-hole or aperture 23 in a spaced apart relationship relative to each other and the central through-hole or aperture 23.

The stator assembly 12 also includes a plurality of elongate thermoplastic bobbins 26 mounted on the plurality of posts 25 respectively in a relationship with the plurality of bobbins 26 surrounding the plurality of posts 25 respectively.

A plurality of electrical coil packs 28 surround the plurality of bobbins 26 respectively. The bobbins 26 and the coil packs 28 are positioned on the base 22 relative to each other such that a slot or gap 30 is defined between each of the bobbins 26 and coils 28. The embodiment shown defines six slots or gaps 30.

The rotor assembly 14 includes a flat base 32 in the form and shape of a disc defining a central through-hole or aperture 34. The base 32 is made from powder metal. A flat magnet 36 is seated against the exterior surface of the bottom face 38 of the rotor base 32. In the embodiment shown, the magnet 36 is in the form and shape of a disc and defines a central through-hole or aperture 39 having a diameter greater than and spaced from the central through-hole or aperture 34 defined in the rotor base 32. In the embodiment shown, the magnet 36 is made of compression bonded Neo Ferrite magnetic material and is comprised of a plurality of pairs of N-S magnetic poles and, still more specifically, a magnet 36 with eight alternating N-S poles.

The rotor assembly 14 and the stator assembly 12 are positioned relative to each other in an overlapping relationship with the exterior bottom face of the magnet 36 of the rotor assembly 14 positioned opposite, spaced from, and parallel to, the exterior top face of the armature posts 25, bobbins 26, and the coils 28 of the stator assembly 12 and further in a relationship spaced from and parallel to the base 22 of the stator assembly 12. In this relationship, the two pairs of coils 28 (or four coils or two phases) are energized in response to the rotation of the rotor assembly 14 and the magnet 36 at any commutation stage.

The sleeve bushing 16, the bearings 18 and 20, and the motor shaft 21, which is oriented in a relationship generally normal to the base 22 of the stator assembly 12 and the rotor assembly 14, are assembled in a relationship that allows for rotation of the rotor assembly 14 relative to the stator assembly 12 in response to the rotation of the motor shaft 21.

Specifically, in the embodiment shown, the lower end of the sleeve bushing 18 extends into the aperture 23 defined in the base 22 of the stator assembly 12 and is seated against the shoulder 24 defined in the interior of the base 22 for mounting the sleeve bushing 16 in the center of the stator assembly 12 in a relationship with the sleeve bushing 16 extending generally normally upwardly and outwardly from the base 22 of the stator assembly 12 and further in a relationship with the respective armature posts 25, bobbins 26, and electrical coil packs 28 surrounding and spaced from the sleeve bushing 16.

The motor shaft 21 extends through the interior of the sleeve bushing 16 and includes a lower end extending through the interior through-hole 23 defined in the base 22 of the stator 12 and thus is oriented and positioned in a relationship normal to the base 22 of the stator assembly 12.

The ball bearing 18 and the thrust bearing 20 mount the motor shaft 21 to the sleeve bushing 16 for rotation relative to both the sleeve bushing 16 and the base 22 of the stator assembly 12.

Specifically, in the embodiment shown, the ball bearing 18 is located in and positioned against a collar 42 formed at the lower end of the sleeve bushing 16 and surrounds a lower end of the motor shaft 21 for mounting the lower end of the motor shaft 21 to the lower end of the sleeve bushing 16 for rotation relative to both the lower end of the sleeve bushing 16 and the base 22 of the stator 12.

The thrust bearing 20 is seated in a collar 44 formed at the upper end of the sleeve bushing 10 and surrounds an upper end of the motor shaft 21 for mounting the upper end of the motor shaft 21 for rotation relative to the upper end of the sleeve bushing 16.

The base 32 of the rotor 14 is mounted to and surrounds an upper end of the motor shaft 21. The magnet 36 is mounted to the underside of the base 32 of the rotor 14 and surrounds and is spaced from the upper end of the motor shaft 21.

In accordance with the present invention, the rotor 14 is designed to move and rotate on the upper end of the motor shaft 21 relative to the stator 12 not only in the standard full steps but also in fractional half or micro steps with or without any feedback sensors as discussed in more detail below.

FIGS. 3B, 4B, 5B, and 6B depict the three phase coil circuit 50 of the stator assembly 12 which, in the embodiment shown, is a generally "Y" shaped circuit comprised of a phase U coil circuit segment 50a including a first pair of coils 28 arranged in parallel, a second phase W coil circuit segment 50b including a second pair of coils 28 arranged in parallel, and a third phase V coil circuit segment 50c including a third pair of coils 28 arranged in parallel.

The phase U circuit 50a and coils 28 are coupled in series with both the phase W and phase V circuits 50b and 50c and coils 28 at a common connection point generally designated with the numeral 52.

Figure 3A:
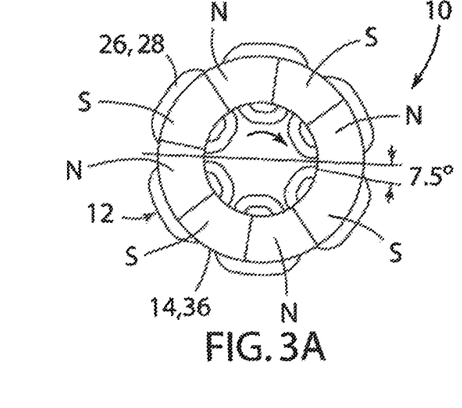
FIG. 3A is a simplified plan view of the stator and position of the rotor of the axial motor in a first driving position of the rotor of the axial motor.
Figure 3B:
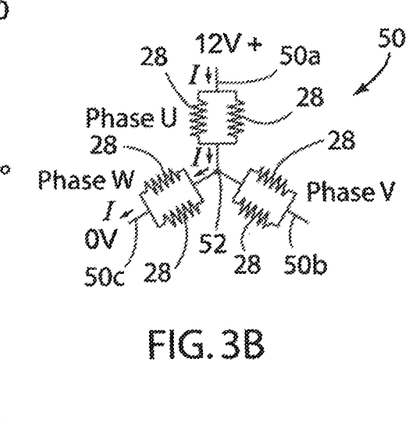
FIG. 3B is a schematic depicting the current flow through the stator coil phase circuit of the axial motor in the first driving position of the rotor of the axial motor.
Figure 3C:
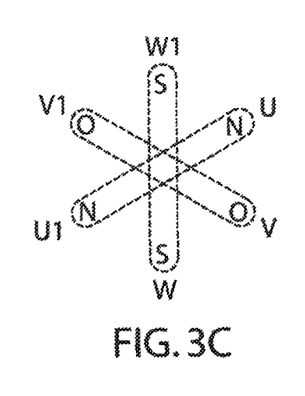
FIG. 3C is a schematic diagram of the rotor magnetic pole orientation of the axial motor in a first driving position of the rotor of the axial motor.

FIGS. 3A, 3B, and 3C respectively depict the rotor position, three phase stator coil circuit 50, and rotor magnetic pole orientation of the motor 10 in a first start driving position of the rotor 14 of the motor 10.

More specifically, FIG. 3A depicts the rotor 14 and, more specifically the magnet 36 thereof, in a first start 7.5 degrees driving position, FIG. 3B depicts the energization and flow of current, generally designate by the letter I, through the phase U and phase W segments or sets of coils 28 of the stator coil phase circuit 50; and FIG. 3C depicts the rotor magnetic pole orientation resulting from the energization of the coils 28 as depicted in FIG. 3B.

Figure 4A:
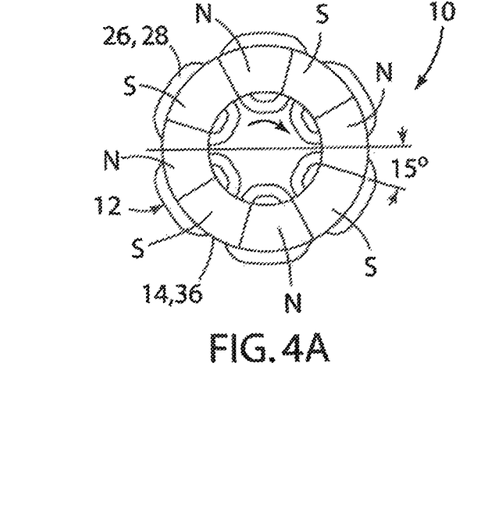
FIG. 4A is a simplified plan view of the stator and position of the rotor of the axial motor in a half step position of the rotor of the axial motor.
Figure 4B:
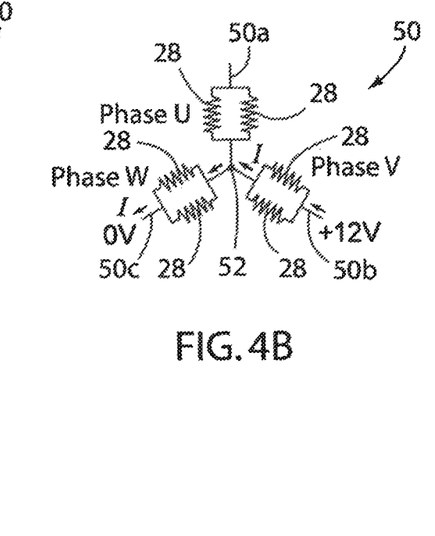
FIG. 4B is a schematic depicting the current flow through the stator coil phase circuit of the axial motor in the half step position of the rotor of the axial motor.
Figure 4C:
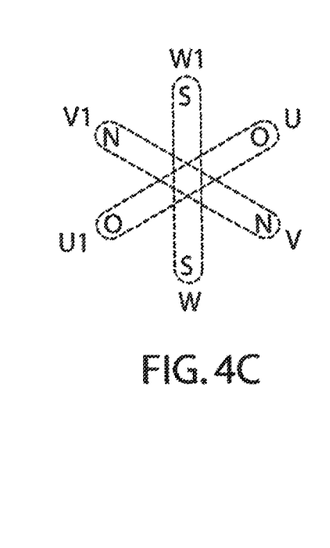
FIG. 4C is a schematic diagram of the rotor magnetic pole orientation of the axial motor in the half step position of the rotor of the axial motor.

FIGS. 4A, 4B, and 4C respectively depict the rotor position, three phase stator coil circuit 50, and rotor magnetic pole orientation of the motor 10 in a first half step holding position of the rotor 14 of the motor 10 relative to the stator assembly 12.

More specifically, FIG. 4A depicts the rotor 14, and more specifically the magnet 36 thereof, turned or rotated 7.5 degrees relative to the first driving position of the rotor 14 as shown in FIG. 3A in response to a switch from the FIG. 3C rotor magnetic pole orientation to the FIG. 4C rotor magnetic pole orientation resulting from a switch in the energization of the coils 28 from the FIG. 3B energization to the FIG. 4B energization where current, generally designated by the letter I, flows through the phase V and phase W coils 28 of the coil phase circuit 50 rather than the phase U and W sets of coils as shown in FIG. 3B.

Still more specifically, in FIGS. 3A and 4A, the letters N and S designate the North and South poles of the magnet 36 of the rotor 14.

In FIG. 3B, the current, generally designated with the letter I, flows from and through the Phase U coil circuit segment 50a and into and through the Phase W coil circuit segment 50c via and through the common central connection point 52 while, in FIG. 4B, the current flow has been switched and flows from and through the Phase V coil circuit segment 50b, rather than the Phase U coil circuit segment 50a as shown in FIG. 3B, and into and through the Phase W coil circuit segment 50c via and through the common central connection point 52.

In FIGS. 3C and 4C, the letters N, S, and O represent North, South, and neutral poles respectively of the magnet 36 of the rotor 14. In FIG. 3C, a pair of S magnetic poles are associated with the phase W and W1 coil circuit segment, a pair of N magnetic poles are associated with the phase U and U1 coil circuit segment, and a pair of O magnetic poles are associated with the phase V and V1 coil circuit segment. In FIG. 4C, the S magnetic poles are associated with the phase W and W1 coil circuit segment, the N magnetic poles are associated with the phase V and V1 coil circuit segment, and the O magnetic poles are associated with the phase U and U1 coil circuit segment.

In accordance with the present invention, the rotor 14 is held in the half step FIG. 4A position until the coil energization is switched from the FIG. 4B energization back into the FIG. 3B energization which results in a switch of the rotor magnetic pole orientation back from the FIG. 4C orientation to the FIG. 3C orientation to move or turn the rotor 14 another 7.5 degrees relative to the position of FIG. 4A to allow the rotor 14 to complete and finish its full 15 degree step rotation.

In accordance with the present invention, the addition of 7.5 degree fractional half step rotations of the rotor 14 between 15 degree full step rotations of the rotor 14 provides at least the following advantages: it improves system and motor performance by doubling resolution and reducing resonances; is a cost effective solution that eliminates the need for a motor with a higher number of full steps; and the position error is noncumulative.

The motor 10 is also adapted for full step holding in three phase mode as described below with reference to FIGS. 5A, 5B, 5C, 6A, 6B, and 6C.

Figure 5A:
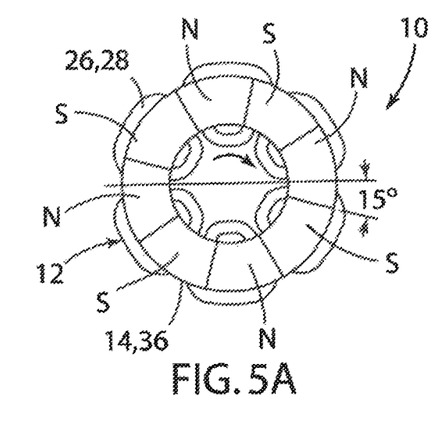
FIG. 5A is a simplified plan view of the stator and position of the rotor of the axial motor in a half step position of the rotor of the axial motor.
Figure 5B:
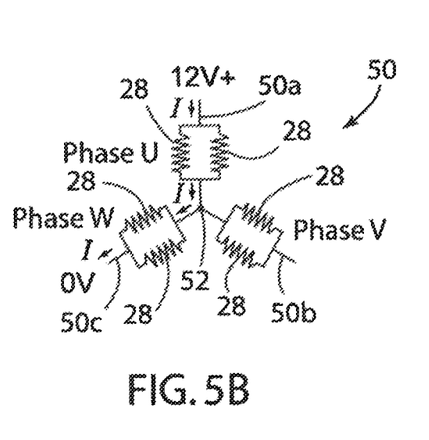
FIG. 5B is a schematic depicting the current flow through the stator coil circuit of the axial motor in the half step position of the rotor of the axial motor.
Figure 5C:
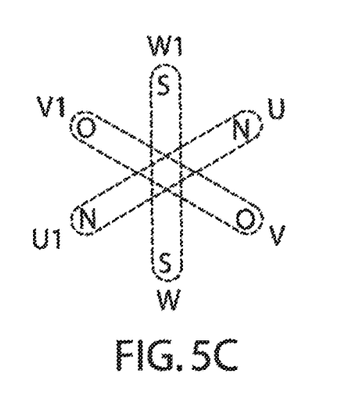
FIG. 5C is a schematic diagram of the rotor magnetic pole orientation of the axial motor in the half step position of the rotor of the axial motor.

FIGS. 5A, 5B, and 5C are similar to FIGS. 3A, 3B, and 3C and thus the earlier description of FIGS. 3A, 3B, and 3C is incorporated herein by reference with respect to FIGS. 5A, 5B, and 5C.

Figure 6A:
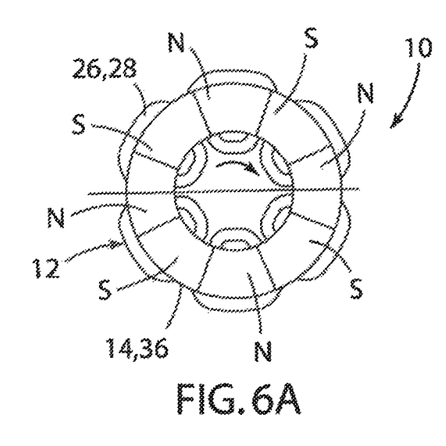
FIG. 6A is a simplified plan view of the stator and position of the rotor of the axial motor in a full step hold position of the rotor of the axial motor.
Figure 6B:
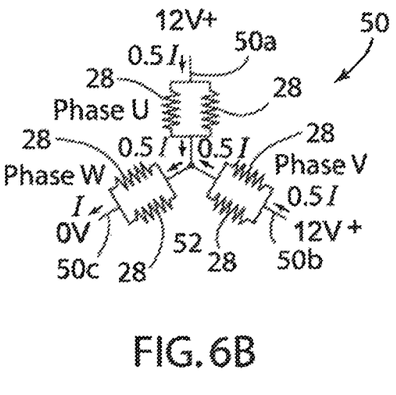
FIG. 6B is a schematic depicting the current flow through the stator coil phase circuit of the stator of the axial motor in the full step hold position of the rotor of the axial motor.
Figure 6C:
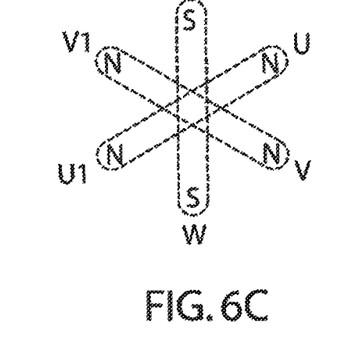
FIG. 6C is a schematic diagram of the rotor magnetic pole orientation of the axial motor in the full step hold position of the rotor of the axial motor.

FIGS. 6A, 6B, and 6C depict the rotor 14 in its full step hold position following rotation thereof 15 degrees in response to a switch in the coil phase energization circuit from the driving coil energization circuit depicted in FIG. 5B in which current, generally designated by the letter and reference I, flows from and through the phase U coil circuit segment 50a and through the phase W coil circuit segment 50c via and through the common junction point 52 to the coil energization circuit as depicted in FIG. 6B in which current, generally designated by the letter and reference 0.5I, flows from and through both the phase U and V coil circuit segments 50a and 50b respectively and into and through the phase W coil circuit segment 50c via and through the common junction point 52.

This switch in pattern of coil energization results in a change or switch in rotor magnetic pole orientation as depicted in FIG. 6C in which a pair of S poles are associated with the phase W and W1 coil circuit segment, a first pair of N poles are associated with the U and U1 coil circuit segment, and a second pair of N poles are associated with the phase V and V1 coil circuit segment.

Energization of the individual Phase U, V, and W coil circuit segments 50a, 50b, and 50c of the stator coil phase circuit 50 as depicted in FIG. 6B holds the rotor 14 in the position of FIG. 6A. A switch in the coil energization from the FIG. 6B energization back to the energization as depicted in FIG. 4B will release the hold on the rotor 14 and allow for another half step or full step rotation of the rotor 14 as described above.

The motor 10 of the present invention is also adapted or micro instead of half step movement between full steps.

Figure 7:
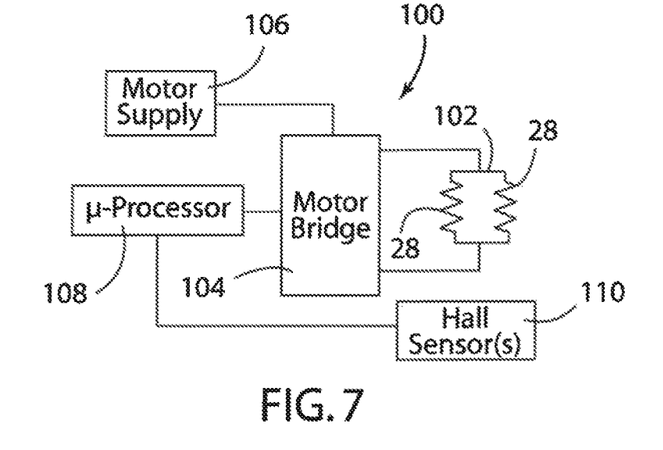
FIG. 7 is a block diagram of a micro stepping motor drive and stator coil phase circuit.

In accordance with one embodiment, the micro stepping of the rotor 14 may be accomplished by separating the three connected coil energization phases and circuits depicted in FIGS. 3B, 4B, 5B, and 6B into three separate coil energization phases or circuits 100 as depicted in FIG. 7 and each including a one phase coil circuit 102 including a pair of coils 28 coupled in parallel; a motor bridge 104 coupled to the one phase coil circuit 102; a motor supply 106 coupled to the motor bridge 104; a microprocessor 108 coupled to the motor bridge 104; and a Hall Effect sensor(s) 110 coupled to the microprocessor 108.

Figure 8:
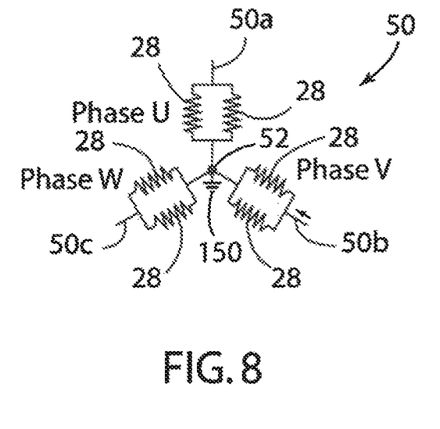
FIG. 8 is a schematic diagram of a micro stepping stator coil phase circuit with a ground connection.

In accordance with another embodiment, the micro stepping of the rotor 14 may be accomplished by the addition of a ground connection generally designated by the numeral 150 in FIG. 8 at the common point 52 of the three phase coil circuit 50 depicted in FIG. 8 which is otherwise identical in structure to the three phase coil circuit depicted in FIGS. 3B, 4B, 5B, and 6B.

In accordance with these embodiments, if each input phase current is driven by sine and cosine waveforms, then the motor 10 can operate in a synchronous manner and micro-stepping is a technique that will increase motor resolution by controlling both the direction and amplitude of the current in each phase and, more specifically, by making the current flow through the phase coils a fraction of either full on current in one direction or full on current in the opposite direction. Since and cosine micro-stepping are the most common forms, but other waveforms can be used as well.

Numerous variations and modifications of the axial brushless DC motor described above may be effected without departing from the spirit and scope of the novel features of the invention. It is thus understood that no limitations with respect to the structure or stepping function of the axial brushless DC motor illustrated herein is intended or should be inferred. It is, of course, intended to cover by the appended claims all such modifications as fall within the scope of the claims.

We claim:

1. An axial brushless DC motor comprising:
    a stator including a plurality of coils, a base of the stator defining a central through-hole;
    a rotor including a magnet with a plurality of pairs of magnetic poles and adapted for movement relative to the stator in one or more full steps;
    an elongate sleeve bushing extending through the stator, the sleeve bushing further defining an interior through-hole therein;
    an elongate motor shaft extending through the interior through-hole of the sleeve bushing and including an upper end and a lower end, the lower end extending through the interior through-hole of the stator;
    a bearing mounting the motor shaft to the sleeve bushing for rotation relative to the sleeve bushing and the base of the stator, the bearing positioned against an end of the sleeve bushing, the end of the sleeve bushing extending into the central through-hole defined in the base of the stator; and
    a generally Y shaped coil phase circuit including first, second, and third coil phase circuit segments with respective first ends coupled to each other at a common connection point;
    the coil phase circuit adapted for moving the rotor on the upper end of the motor shaft relative to the stator a fractional step less than the one or more full steps and holding the rotor at the one or more fractional or full steps,
    wherein each of the first, second, and third coil phase circuit segments are energizable for holding the rotor at the one or more fractional steps between the one or more full steps relative to the stator.

2. The axial brushless DC motor of claim 1, wherein the coil phase circuit is a three phase circuit adapted to switch the orientation of one or more of the plurality of pairs of magnetic poles of the rotor during operation of the motor and hold the rotor at a half step between the one or more full steps.

3. The axial brushless DC motor of claim 1, wherein the coil phase circuit is a three phase coil circuit adapted to switch the orientation of one or more of the plurality of pairs of magnetic poles of the rotor during operation of the motor and hold the rotor at the fractional or the full steps.

4. The axial brushless DC motor of claim 1, wherein the coil phase circuit includes a one phase coil circuit, a motor bridge coupled to the one phase coil, a motor supply coupled to the motor bridge, a microprocessor coupled to the motor bridge, and a Hall Effect sensor coupled to the microprocessor for moving the rotor during the operation of the motor in micro steps between the one or more full steps.

5. The axial brushless DC motor of claim 1, wherein the common connection point is coupled directly to ground for moving the rotor in micro steps during the operation of the motor between the one or more full steps.

6. An axial brushless DC motor comprising:
    a stator including a plurality of coils, a base of the stator defining a central through-hole;
    a rotor including a magnet with a plurality of pairs of magnetic poles and adapted for movement relative to the stator in full step positions;
    an elongate sleeve bushing extending through the stator, the sleeve bushing further defining an interior through-hole therein;

an elongate motor shaft extending through the interior through-hole of the sleeve bushing and including an upper end and a lower end, the lower end extending through the interior through-hole of the stator;

a bearing mounting the motor shaft to the sleeve bushing for rotation relative to the sleeve bushing and the base of the stator, the bearing positioned against an end of the sleeve bushing, the end of the sleeve bushing extending into the central through-hole defined in the base of the stator; and a coil phase circuit including first, second, and third coil phase segments including respective first segment ends connected directly to each other for connecting the first, second, and third coil phase segments in series at a common central connection point, each of the coil phase segments including a pair of coils configured in parallel and each of the coils in the pair of coils including respective first coil ends connected to the respective first segment ends of the first, second, and third coil phase segments which are connected to the common central connection point, and current being adapted for flow through the coil phase circuit in a manner adapted to switch the orientation of one or more of the plurality of pairs of magnetic poles of the magnet for moving the rotor on the upper end of the rotor shaft relative to the stator a fractional step position less than the full step position and holding the rotor at the fractional step position or full step position, wherein each of the first, second, and third coil phase segments are energizable for holding the rotor at the fractional step position or the full step position relative to the stator.

7. The axial brushless DC motor of claim 6, wherein the rotor is movable from a first driving position into the fractional step position less than the full step position by switching the flow of current from between the first and third coil phase segments through the common central connection point to between the second and third coil phase segments through the common central connection point.

8. The axial brushless DC motor of claim 6, wherein the rotor is movable from a first driving position into the full step hold position by switching the flow of current from between the first and third coil phase segments through the common central connection point to between the first and second coil phase segments and through the third coil phase segment through the common central connection point.

9. An axial brushless DC motor comprising:
a stator including a plurality of coils, a base of the stator defining a central through-hole;
a rotor including a magnet and adapted for movement in full or fractional step position relative to the stator;
an elongate sleeve bushing extending through the stator, the sleeve bushing further defining an interior through-hole therein;
an elongate motor shaft extending through the interior through-hole of the sleeve bushing and including an upper end and a lower end, the lower end extending through the interior through-hole of the stator;
a bearing mounting the motor shaft to the sleeve bushing for rotation relative to the sleeve bushing and the base of the stator, the bearing positioned against an end of the sleeve bushing, the end extending into the central through-hole defined in the base of the stator;
a generally Y shaped coil phase circuit including first, second, and third coil phase segments coupled together in series at a common central connection point, each of the first, second, and third coil phase segments including a pair of coils coupled in parallel, and energizable for moving the rotor on the upper end of the motor shaft between a first driving position and full or fractional step hold positions relative to the stator and for holding the rotor at the full or fractional step hold positions relative to the stator.

10. The axial brushless DC motor of claim 9, wherein the rotor is movable between the first driving position and the full or fractional hold positions relative to the stator by switching the flow of current through the first, second, and third coil phase segments of the coil phase circuits.

11. The axial brushless DC motor of claim 10, wherein the rotor is movable from the first driving position in which current flows through the first and third coil phase segments through the common central connection point to the fractional step hold position in which the flow of current has been switched to flow through the second and third coil phase segments.

12. The axial brushless DC motor of claim 10, wherein the rotor is movable from the first driving position in which current flows through the first and third coil phase segments through the common central connection point to the full step hold position in which the flow of current has been switched to flow through both of the first and second coil phase segments and into the third coil phase segment through the common central connection point.

* * * * *